(12) United States Patent
Langer

(10) Patent No.: US 8,170,211 B2
(45) Date of Patent: May 1, 2012

(54) HUB DEVICE FOR A NETWORK COMPRISING QUANTUM CRYPTOGRAPHIC CONNECTIONS AND NODE MODULE FOR SAID HUB DEVICE

(75) Inventor: Thomas Langer, Vienna (AT)

(73) Assignee: Austrian Research Centers GmbH-ARC, Vienna (AT)

( * ) Notice: Subject to any disclaimer, the term of this patent is extended or adjusted under 35 U.S.C. 154(b) by 621 days.

(21) Appl. No.: 12/306,224

(22) PCT Filed: Jun. 27, 2007

(86) PCT No.: PCT/AT2007/000316
§ 371 (c)(1),
(2), (4) Date: Dec. 22, 2008

(87) PCT Pub. No.: WO2008/003104
PCT Pub. Date: Jan. 10, 2008

(65) Prior Publication Data
US 2009/0279698 A1    Nov. 12, 2009

(30) Foreign Application Priority Data
Jul. 3, 2006   (AT) ................................ A 1118/2006

(51) Int. Cl.
*H04K 1/00* (2006.01)
(52) U.S. Cl. ........................................ 380/256; 380/278
(58) Field of Classification Search ............... 380/255, 380/277, 278–285
See application file for complete search history.

(56) References Cited

U.S. PATENT DOCUMENTS

| | | | | |
|---|---|---|---|---|
| 6,895,091 B1* | 5/2005 | Elliott et al. | .................. | 380/278 |
| 7,068,790 B1 | 6/2006 | Elliott | .......................... | 380/278 |
| 7,706,535 B1* | 4/2010 | Pearson et al. | ................ | 380/255 |
| 7,831,050 B2* | 11/2010 | Barbosa | ........................ | 380/278 |
| 7,929,700 B2* | 4/2011 | Lodewyck et al. | ........... | 380/256 |
| 2004/0078421 A1* | 4/2004 | Routt | ............................. | 709/201 |
| 2004/0109564 A1* | 6/2004 | Cerf et al. | ..................... | 380/256 |

(Continued)

FOREIGN PATENT DOCUMENTS
WO    WO 2004/049623    6/2004

OTHER PUBLICATIONS

Collins and Riedmatten, "Quantum relays for long distance quantum cryptography," *Journal of Modern Optics*, 735-753, 2005.

(Continued)

*Primary Examiner* — Christopher Brown
*Assistant Examiner* — Fahimeh Mohammadi
(74) *Attorney, Agent, or Firm* — Fulbright & Jaworski L.L.P.

(57) ABSTRACT

The invention relates to a node device (21) for a network (20) comprising quantum cryptographic connections (1) provided with quantum channels (4) and public channels (5), comprising quantum optics means (11) for connecting to the respective quantum channels, for generating secrets or keys by means of quantum cryptography, comprising means (13) for managing symmetrical secrets or keys, cryptography means (14) for generating cryptograms, and driver means (15) connected thereto for transmission via a public channel, wherein the means (15) for managing symmetrical secrets or keys and the cryptography and driver means (14; 15) are combined in a common node module (24) as central components (13, 14, 15) for a plurality of quantum channel connections, while the quantum optics means (11) are provided separately in decentral modules (23) for the plurality of quantum channel connections.

8 Claims, 3 Drawing Sheets

U.S. PATENT DOCUMENTS

| | | | |
|---|---|---|---|
| 2004/0120528 A1* | 6/2004 | Elliott et al. | 380/278 |
| 2006/0002563 A1 | 1/2006 | Bussieres | 713/171 |
| 2006/0263096 A1* | 11/2006 | Dinu et al. | 398/187 |
| 2008/0152147 A1* | 6/2008 | Xia et al. | 380/279 |

OTHER PUBLICATIONS

Dur et al., "Quantum repeaters based on entanglement purification," Online, Retrieved Sep. 30, 2007, http://arxiv.org/PS_cache/quant0ph/pdf/6808/9808065v1.pdf.

Dusek et al., "Quantum cryptography," *Progress in Optics*, vol. 49, 2006.

Elliott, "Building the quantum network," *New Journal of Physics*, 4: 461-462, 2002.

Gisin et al., "Quantum cryptography," *Rev. Mod. Phys.*, 74: 145, 2002.

International Preliminary Report on Patentability, issued in Int. App. No. PCT/AT2007/000316, mail date Jan. 20, 2009.

International Search Report, issued in Int. App. No. PCT/AT2007/000316, mail date Oct. 17, 2007.

Peev et al., "Quantum key distribution networks: basic concepts, topologies and the SEQOQCquantum back bone," *Elektrotechnik Und Informationstechnik*, 124 (5): 126-130, 2007.

Wegman and Carter, "New hash functions and their use in authentication and set equality," *Journal of computer and System Sciences*, 22: 265, 1981.

* cited by examiner

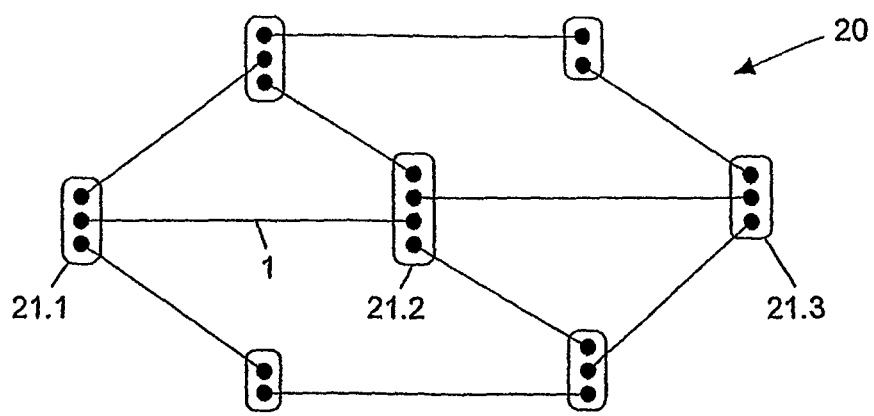
Fig. 3
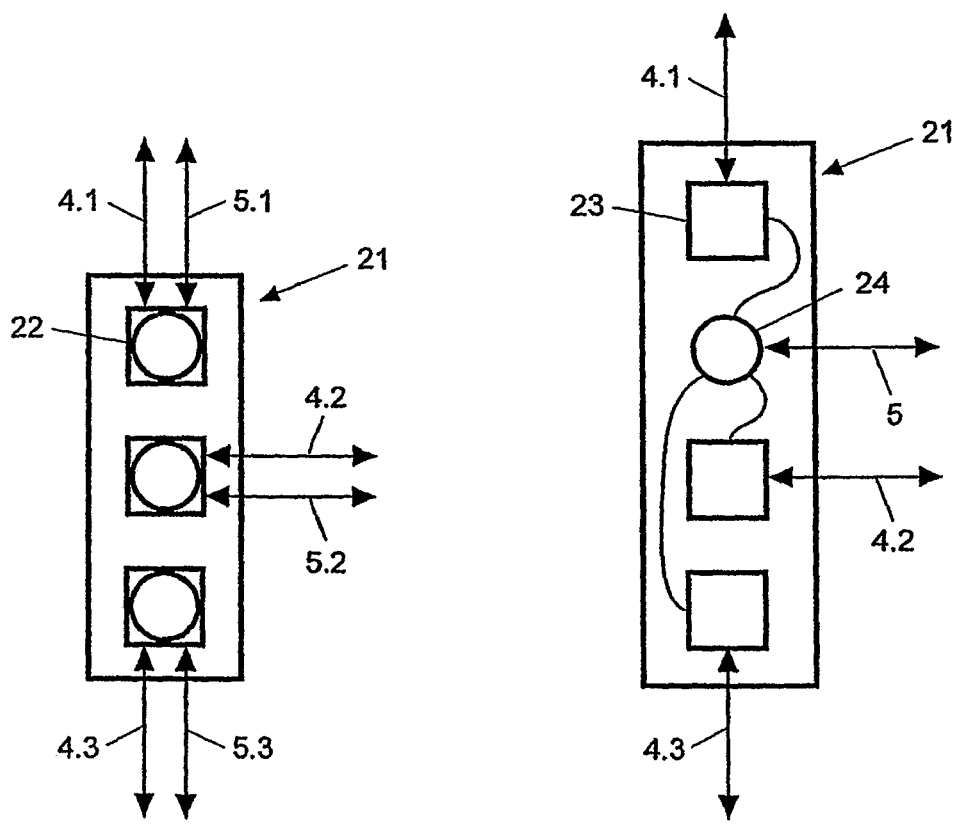
Fig. 4A    Fig. 4B
Fig. 4

HUB DEVICE FOR A NETWORK COMPRISING QUANTUM CRYPTOGRAPHIC CONNECTIONS AND NODE MODULE FOR SAID HUB DEVICE

This application is a national phase application under 35 U.S.C. §371 of International Application No. PCT/AT2007/000316 filed 27 Jun. 2007, which claims priority to Austrian Application No. A 1118/2006 filed 3 Jul. 2006. The entire text of each of the above-referenced disclosures is specifically incorporated herein by reference without disclaimer.

The invention relates to a node (hub) device for a network including quantum cryptographic links with quantum channels and public channels, which node device includes quantum optical means for connection with the respective quantum channels, for the generation of quantum cryptographic secrets or keys, means for managing symmetrical secrets or keys, cryptographic means and driver means connected therewith for the generation of cryptograms and their transmission via a public channel.

The invention further relates to a node module for such a node device.

By quantum cryptography, the technology of producing and distributing symmetrical secrets is denoted, wherein the security as a measure of the confidentiality and unadulterated-ness of two identical bit sequences emitted from two mutually remote locations can be precisely verified mathematically by quantum information theoretical methods (information-theoretical security). The produced and distributed symmetrical secrets subsequently may, for instance, be used as keys for symmetrical cryptographic ciphering methods. By contrast, no such security proof is available for conventional key distribution systems based on asymmetrical cryptography.

Quantum cryptography was interdisciplinarily developed between the scientific fields of quantum physics, quantum optics, information theory, cryptography and informatics. A survey on the principles and methods as well as historical development of quantum cryptography is contained in the articles by Gisin, N., G. Ribordy, W. Tittel, and H. Zbinden, "Quantum Cryptography", 2002 Rev. Mod. Phys. 74, 145; and Dŭsek, M, N. Lütkenhaus, M. Hendrych, "Quantum Cryptography", 2006, Progress in Optics, Vol. 49, Edt. E. Wolf (Elsevier, 2006).

A usual quantum cryptographic link always consists of two stations or apparatus. In the literature, and also in the following, these stations are usually denoted as ALICE and BOB components. These stations, which are installed on two mutually remote locations, are connected with each other by an optical quantum channel (in an optical fiber-bound manner or through the free space) as well as by a conventional, classical, unencrypted electronic communication channel, also called public channel.

Such a quantum cryptographic link, in its ALICE and BOB components, constantly produces symmetrical secrets (i.e. secrets identical in the ALICE and BOB components), which can be delivered outwardly via data channels for further use, e.g. as keys in associated cryptographic systems. However, the ALICE and BOB components also may already contain cryptographic systems for the generation of so-called virtual private network tunnels (VPN tunnels), in which case no secrets (keys) will be delivered outwardly, but the data to be encrypted will rather be conducted into either the ALICE or the BOB module in order to be encrypted with stream or block ciphers using the generated keys. The cryptogram will then be transmitted via the classical data channel to the remote or counter station, where the data is again conducted out of the module after having been decrypted. Such systems are also denoted as link encryptors.

The quantum optical means of the quantum cryptographic stations, e.g. the ALICE and BOB components, have different structures depending on the employed technologies. They all have, however, in common that the ALICE component, the quantum channel and the BOB component, by the aid of optical and electronic components, namely, in particular, photon sources, photon detectors, optical fibers, interferometers, mirrors, lenses, crystals, sensors, actuators etc., will form a quantum optical system in which photons are produced, transmitted and measured. The results of measurements performed in the ALICE and BOB components contain correlated information such that these components will be able to create an identical secret. To this end, it is, however, necessary for the ALICE and BOB components to transmit further classical information via the public channel also connecting them, while implementing the key distillation protocol.

For further information relating to this already well known technique, it is referred to WO 2004/049623 A1 in addition to the aforementioned articles by Gisin et al. and Dusek et al., and the citations contained therein. The contents of those publications is considered as included herein by reference in order to obviate a more detailed description of the known quantum cryptographic techniques as regards key generation.

The maximum length of such a quantum channel suitable for quantum cryptography is limited by physical properties; the loss of light within the optical fiber cable or even in the free space will, in particular, have effects in this respect; for this reason and with regard to improving the availability of quantum cryptographic links, it is desirable to interconnect to a network structure several of such binary quantum cryptographic links; it will thereby be feasible to bridge even larger distances with a higher level of fail-safety. When using parallel transmission paths within a network, the key distribution rate (distilled and distributed key per time unit) will, moreover, be enhanced as compared to a single quantum cryptographic link. Such a quantum cryptographic network, or briefly quantum network, may be comprised of network nodes which are interconnected by binary quantum cryptographic links; in this context, it may, for instance, be referred to the article by Chip Elliott, "Building the quantum network", New Journal of Physics 4 (2002), 46.1-46.12, IOP Publishing Ltd and Deutsche Physikalische Gesellschaft. In that article, simple networks with trusted relay stations are above all disclosed, yet it is also described how a way of connection via another communication path, via other relay stations, can be established to the desired terminal station if a quantum cryptographic link has failed.

In general, nodes in such a network would comprise several, e.g. two, three, four, etc., quantum cryptographic links to other nodes of the network, wherein a quantum channel and a classical data channel, i.e. pubic channel, would each be present in one such quantum cryptographic link. For each of these quantum cryptographic links, a separate implementation of key management means, cryptographic means and driver means is required for the public channel in addition to the specific quantum cryptographic components, i.e. the quantum optical means proper, as well as optionally protocol means, which are responsible for the respective key distillation protocols. This involves considerable expenditures for the individual nodes, which will in fact increase with the number of quantum cryptographic links provided for a node.

It is an object of the present invention to enable a simplified structure of such a node device and, hence, to achieve a simplified implementation and reduction of the implementation cost by reduced apparative and program-technical expenditures.

To solve this object, the invention provides a node device and a node module as defined in the annexed independent claims. Advantageous embodiments and further developments are indicated in the dependent claims.

The technique according to the invention provides specific means, namely, in particular, the key management means, the cryptographic means and the driver means, for the public channel, "taken out" of the individual quantum cryptographic links and provided in a joint node module as a central key management component, cryptographic component and driver component for the public channel and, hence, made centrally available to all of the quantum cryptographic links of the respective node. These shared central components will thus handle all quantum cryptographic links, which may, in turn, be simplified or modified to the extent that no implementations will be required any longer for the three mentioned components, so that only the quantum optical means as well as, optionally, protocol processor means may remain for these links in the decentralized quantum channel modules—in connection with the respective quantum channel.

In order to enable the common node module with the individual quantum channel modules to communicate in an efficient manner as far as the communication relating to the symmetrical secrets (or keys) as well as protocol messages are concerned, a shared key interface and, optionally, also a shared protocol message interface are suitably provided; these interfaces are connected with the individual quantum channel modules, and the key management component as well as the cryptographic component are connected to these interfaces within the node module. In detail, as concerns the quantum channel modules, the respective protocol processor components are, in particular, connected with the key interface and/or the protocol message interface.

In a preferred manner, a shared central network component is, furthermore, contained in the joint node module, in connection with the key management component and the cryptographic component. The network component, inter alia, serves to determine the mode of procedure according to which possible secrets (keys) present in the key management component will be safely transmitted to the key management component of another network node by the aid of the cryptographic component and the driver component for the public channel. This passing-on of secrets (keys) from one node to another node will only be feasible if they share a secret (key).

In the following, the invention will be explained in more detail by way of preferred exemplary embodiments illustrated in the drawing, to which it should, however, not to be restricted, wherein, in the beginning, also prior art structures will be explained for an easier understanding. In detail:

FIG. 1 schematically illustrates a quantum cryptographic link between two partners according to the prior art;

FIG. 3 is a mere schematic illustration of a network including quantum cryptographic links between nodes, with the respective units according to FIG. 2 being provided for each of the quantum cryptographic links within the individual nodes;

Figure 5:
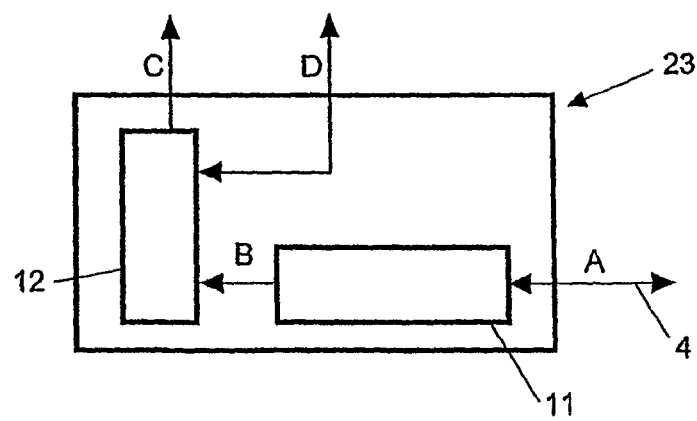
Figure 6:
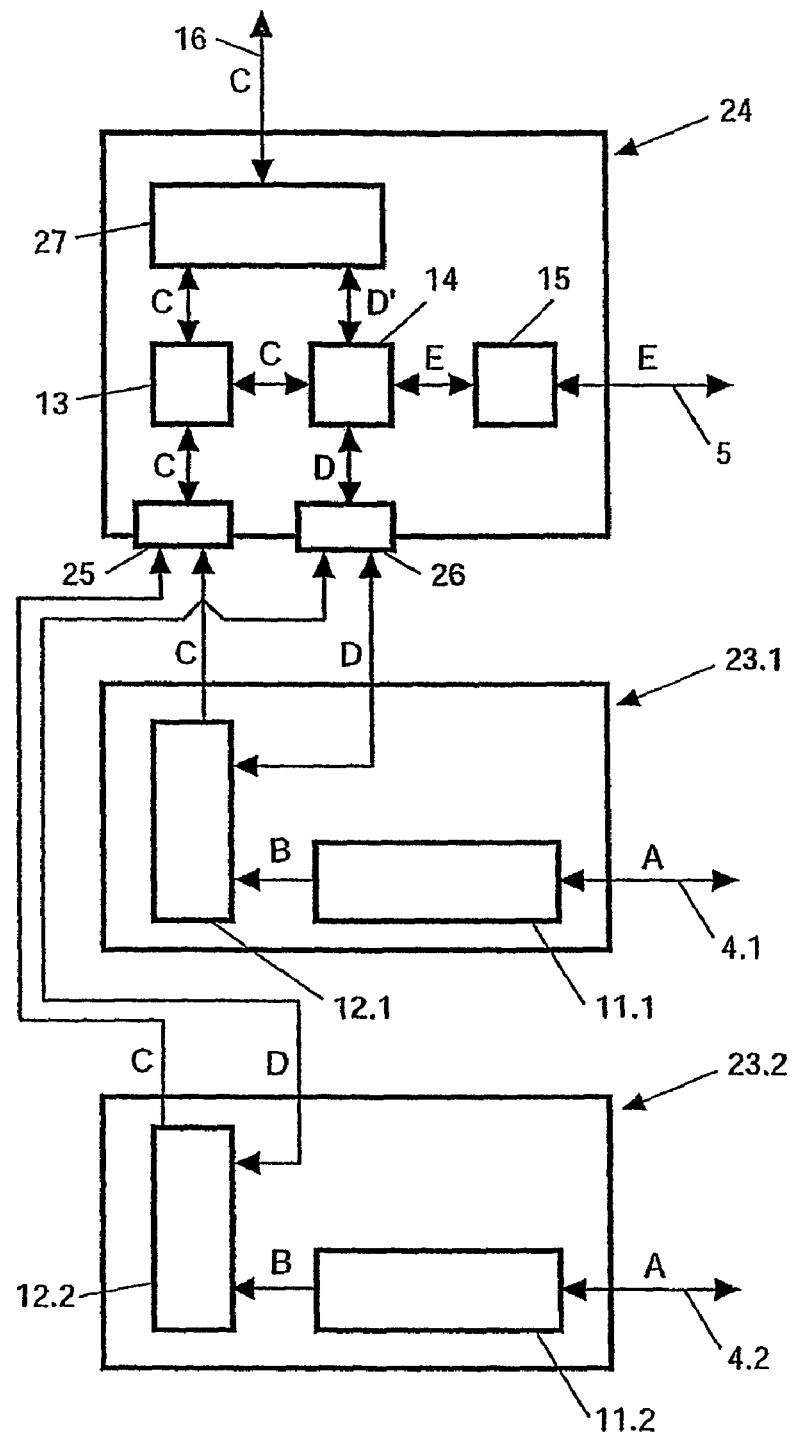

FIG. 4, in partial FIGS. 4A and 4B, respectively illustrates a node device for generating nodes in the network according to FIG. 3, FIG. 4A schematically indicating the conventional technology and FIG. 4B, for reasons of comparison, schematically indicating the technology according to the present invention, in which individual components of the respective units are "separated out" for the quantum cryptographic links and used as central, shared components for all links such that the modules directly associated with these links are accordingly simplified;

FIG. 5 is a schematic block diagram of such a decentralized quantum channel module associated with the respective quantum cryptographic link; and FIG. 6 is a schematic block diagram of a basic structure of a node device according to the invention, including a separate, central node module and decentralized quantum optical modules for the individual quantum cryptographic links connected with the former.

Figure 1:
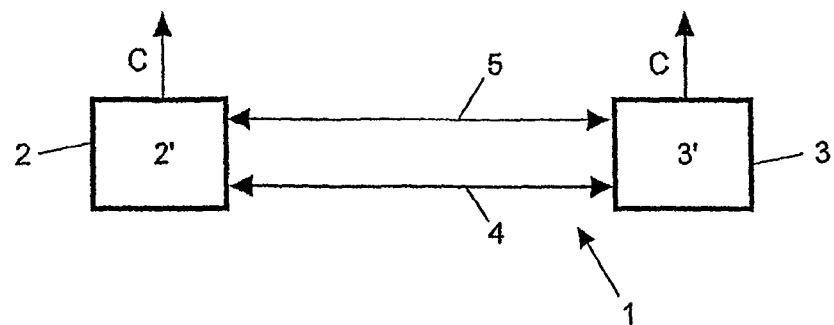

FIG. 1 depicts a conventional quantum cryptographic link 1 with two partners 2, 3, including the respective apparatus 2' and 3', respectively, wherein, between the two partners or stations 2, 3, an optical quantum channel 4, on the one hand, and a classical public data channel 5, on the other hand, are provided. The quantum channel 4 may, for instance, be formed by an optical fiber line or even by the free space, with respective transmitter and receiver devices being provided in the apparatus 21, 31 in both cases. The stations 2, 3 in the literature are usually denoted as ALICE component and BOB component, respectively, and a site which tries to eavesdrop on the quantum channel 4 via which the raw key is exchanged, is usually called EVE (from eavesdropper) in the literature. A more detailed explanation, in particular in respect to the formation of the individual components as well as the physical procedures, even in the case of an eavesdropping attempt, may be obviated in view of the aforementioned literature. In the following, only the general structure of such a station 2 or 3 will generally be explained by way of FIG. 2.

Figure 2:
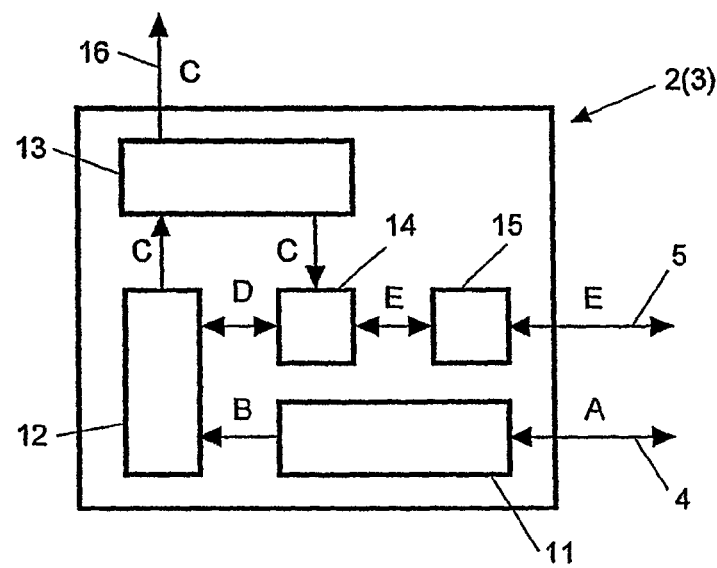
FIG. 2 shows a quantum cryptographic link device according to the prior art, as it is substantially provided for one of the partners of the link according to FIG. 1.

Accordingly, FIG. 2 depicts a station 2 (or 3) including quantum optical means or a quantum optical component 11, which is associated to a quantum channel 4 via which quantum information A comprised of optical photons is exchanged. In the illustrated example, this quantum optical component 11 is connected with a protocol processor component 12, said protocol processor component 12 being provided with information B relating to the raw key (correlated information) by the quantum optical component 11. From this, the protocol processor component 12 will distil the key or, in general, the secret and then direct the same to a key management component 13 according to the information flow C in FIG. 2. Also provided according to FIG. 2 is a cryptographic component 14 which is connected with the key management component 13 and, moreover, with the protocol processor component 12, from which it will receive a protocol message D, and cryptograms (data or information E), i.e. authenticated protocol messages, will be exchanged between this cryptographic component 14 and a driver component 15. These cryptograms are transmitted via the public channel 5. Furthermore, FIG. 2 illustrates at 16 that secrets (keys) are output for further use in external applications.

In the quantum optical means or components 11 of the ALICE and BOB stations 2 and 3, respectively, information is encoded into optical quantum systems in a conventional manner using optical and electronic components such as, in particular, quantum sources and quantum detectors, and the transmission to the respective counter location is effected via the quantum channel 4. The respective optical structure will in each case be a function of the technology employed, the technology in the present case being irrelevant as far as the concept of the network node device to be elucidated below is concerned, because this node device or node module can be operated with any quantum cryptographic links.

The security of the information transmitted in the quantum channel 4 (photons having specific properties) goes back to the fact that this information is encoded into non-orthogonal quantum states which, due to Heisenberg's uncertainty relation, cannot be safely distinguished without irrevocably disrupting the quantum system. Although it is impossible to thereby prevent eavesdropping, it can nevertheless be reliably discovered.

From the quantum optical components 11 of stations 2, 3, the raw keys B, which are basically comprised of correlated classical information (B in the ALICE station 2 correlating with B in the BOB station 3), are transmitted to the protocol processor components 12. In these, a multistage key generation protocol is executed in a program-controlled manner in order to deliver an identical key C to the respective key management components 13 both on the ALICE side 2 and on the BOB side 3. In the course of executing the key generation protocol, classical protocol messages C ("classical" as opposed to quantum information of the quantum channel 4) will have to be transmitted between the protocol processor components 12 of ALICE 2 and BOB 3 via a conventional data channel. These messages can be transmitted in unencrypted form without compromising the security of the overall system, yet both the source property and the integrity property will have to be ensured for these messages. These properties, which can be summarized under the term "authenticity", can be guaranteed in the cryptographic component 14 by symmetrical cryptographic methods (cryptographic test sums with information-theoretical security, cf., e.g., the principle according to Wegman, M. N. and J. L. Carter, "New hash functions and their use in authentication and set equality", 1981, Journal of Computer and System Sciences 22, 265) by the aid of a portion of the symmetrical keys C distilled and distributed in ongoing operation. The cryptogram E, the so-called authenticated protocol message, is finally fed into the public channel 5 by the driver component 15 for this classical data channel 5 and transmitted to the complementary station, where the protocol message is "delivered" to its protocol processor component 12 after having verified its authenticity.

For the sake of completeness, it should be mentioned that the process of the continuous secret-key generation and distribution can only be started if both the ALICE station 2 and the BOB station 3 of a quantum cryptographic link are provided with an identical, so-called initial secret, since the secure generation and distribution of the "first" symmetrical secret will already need the authenticated classical communication channel.

FIG. 3 schematically illustrates a network including quantum cryptographic links as basically explained above, said network 20 including individual nodes, e.g. 21.1, 21.1, 21.3, . . . , generally 21, which help bridge larger distances with a higher level of fail-safety during the data transmission in addition to enabling the respectively desired partner to be reached via parallel transmission paths, for instance at a failure of a cryptographic link. A quantum cryptographic link 1 substantially according to FIG. 1 is only indicated between the two nodes 21.1 and 21.2 by way of example, whereby it is apparent that each node (i.e. each node device 21) is available to several, e.g. two or three or four (cf. node 21.2), such quantum cryptographic links 1. In detail, in such a network 20, several, in the case of node 21.1 three, quantum channels and three public channels (cf. pos. 4 and 5 in FIG. 1) depart from each node to other nodes of the network 20. Even four such quantum channels and public channels, respectively, depart from node 21.2 in FIG. 3. In addition, each node 21 comprises an apparatus as previously explained by way of FIG. 2 for the respective quantum cryptographic links 1, said apparatus being indicated by black points, which means that three such apparatus in the case of node 21.1, and even four apparatus in the case of node 21.2, are provided. Each apparatus of such a quantum cryptographic link, e.g. 1, in particular, has its own implementation of the key management means 13, the cryptographic means 14 and the driver means 15 for the public channel 5.

The partial FIG. 4A of FIG. 4 schematically depicts a node 21 including, for instance, three apparatus as described by way of FIG. 2, wherein per apparatus, e.g. 22, different groups of components are symbolically represented by a square or circle, respectively, the components of both groups being implemented for each apparatus 22 as described. A quantum channel 4.1, 4.2 and 4.3, respectively, as well as a public channel 5.1, 5.2 and 5.3, respectively, depart from each apparatus 22.

By comparison, the network node 21 according to the partial FIG. 4B of FIG. 4 has been modified in that a group of components (indicated by the symbol of a circle) has been taken out of the individual apparatus, e.g. 23, in order to form a node module 24 which functions as a central module for all individual decentralized apparatus, in the following referred to as quantum channel modules 23. Now only one quantum channel 4.1, 4.2. and 4.3, respectively, each departs from the latter quantum channel modules 23, while from node module 24 a public channel 5 departs, via which the node modules 24 of all other nodes 21 of the quantum cryptographic network 20 can be reached. This public channel 5 is realized by the aid of a conventional digital communications network (e.g. the internet), wherein it is irrelevant to the present invention which technologies or topologies are used in each case for this network.

FIG. 5 illustrates such a modified decentralized apparatus reduced in terms of implementation, i.e. such a quantum channel module 23. It is apparent that this quantum module 23, as compared to FIG. 2, only includes the quantum optical component 11 as well as the protocol processor component 12. In FIG. 5, the following data flows are, moreover, indicated analogously to FIG. 2: A—quantum information; B—raw key (correlated information); C—symmetrical secrets (keys); and D—protocol message. This quantum channel module 23 thus corresponds to an ALICE or BOB apparatus, however with the further components, namely, in particular, the key management component, the cryptographic component and the driver component for the pubic channel, now being centrally provided for all of these quantum channel modules 23 (or 23.1, 23.2, . . . according to FIG. 6).

This results from the illustration according to FIG. 6, which illustrates the shared, central node module 24 in association with several, e.g. two, quantum channel modules 23.1, 23.2.

The modified quantum cryptographic network links, i.e. the quantum channel modules 23.1, 23.2, etc., which comprise neither a key management component for the distilled symmetrical secrets nor a cryptographic component for symmetrical cryptographic methods nor a driver component for the classical data channel 5, are connected to the network node module 24 via interfaces 25, 26. Via the interface 25 (the "key interface"), the modified quantum cryptographic network links or modules 23 deliver the generated and distributed symmetrical secrets or keys C to the central key management module 13 of the network node module 24. Moreover, the modified quantum cryptographic network links or modules 23, via the interface 26 (the "protocol message interface"), have write and read access to the shared classical data channel 5 of the network node 21, which, by the aid of the central cryptographic component 14 and the keys provided by the key management component 13, will provide one of the following transmission modi according to demand:

- unencrypted transmission with message authentication (with information-theoretical security)
- encrypted message transmission (with an information-theoretically provable security of the stream cipher—one-time pad; cf. e.g. the article by Gisin et al. mentioned in the beginning)
- encrypted transmission with message authentication (both with information-theoretical security)
- unencrypted transmission The simultaneous operation of the link modules 23 by the central node module 24 is, for instance, ensured by the series implementation or interlocking of tasks to be implemented in parallel (time multiplex), as is common in computer systems.

This conception of a node module 24 which is central for the network node 21 allows for the implementation of a central network component 27 in the node module 24, which, having likewise access to the shared classical channel 5 (with all the mentioned transmission modi), is able to exchange confidential and unadulterated network protocol messages D' with the network components of neighboring network nodes 21 with information-theoretical security. By "neighboring nodes", no network nodes sharing a modified quantum cryptographic network link are necessarily meant, but rather nodes that share secrets (keys), i.e. whose network node modules 24 have stored identical secrets (keys) in their key management components 13. This mechanism renders feasible the implementation of the following network functionalities:

- transmission ("passing on") of secrets (keys) C from the central key management component 13 of a network node 21 to the key management component 13 of a neighboring network node (in the above-explained sense). This mechanism allows secrets (keys) C to be distributed between any nodes 21 of the network 20, thus overcoming the above-mentioned distance limitation of quantum cryptography.
- Load-balanced routing of keys in order to break bottlenecks in the network 20.
- Routing of keys C via alternative links in case specific links have failed.
- Distribution of initial secrets for modified quantum cryptographic network links newly inserted in the network structure between two network nodes already connected via another path (in the graph-theoretical sense).

The invention claimed is:

1. A node device for a network including quantum cryptographic links with quantum channels and public channels, which node device comprises quantum optical connections with the respective quantum channels, for the quantum cryptographic generation of secrets and/or keys, a symmetrical secret and/or key manager, a cryptograph for generating cryptograms, and a driver connected therewith for transmitting the same via a public channel, wherein the symmetrical secret and/or key manager and the cryptograph as well as the driver are combined in a joint node module as central components for several quantum channel links, whereas the quantum optical connections are separately provided in decentralized modules for the several quantum channel links, said node device further comprising a central management component for managing secrets and/or keys, a central cryptographic component connected therewith, and a central driver component connected with the latter, for the shared use by several decentralized quantum channel modules.

2. The node device of claim 1, wherein the joint node module, as a further central component, comprises a network component in connection with the management component and the cryptographic component.

3. The node device of claim 1, wherein the quantum channel modules each have associated a separate protocol processor component.

4. The node module of claim 1, further comprising a central network component in connection with the management component and the cryptographic component.

5. A method for quantum cryptography in a quantum optical network, comprising:

generating quantum cryptographic secrets and/or keys for a plurality of quantum optical connections with a plurality of quantum channels in protocol processor components of the node;

generating cryptograms in a cryptograph portion of the node; and transmitting the cryptograms from a driver portion of the node over a public channel;

wherein a symmetrical secret and/or key manager and the cryptograph as well as the driver are combined in a joint node as central components for several quantum channel links, and the quantum optical connections are separately provided in decentralized modules for the several quantum channel links, and further comprising a central management component for managing secrets and/or keys, a central cryptographic component connected therewith, and a central driver component connected with the latter, for the shared use by several decentralized quantum channel modules.

6. The method of claim 5, wherein the joint node, as a further central component, comprises a network component in connection with the key manager and the cryptograph.

7. The method of claim 5, wherein the quantum optical connections are each established by a plurality of quantum channel modules each have associated a separate protocol processor component.

8. The method of claim 5 further comprising a central network component coupled to the management component and the cryptographic component.

* * * * *